Sept. 24, 1935.  W. M. MALISOFF  2,015,080
SULPHUR REMOVAL FROM HYDROCARBON OILS
Filed Dec. 9, 1930
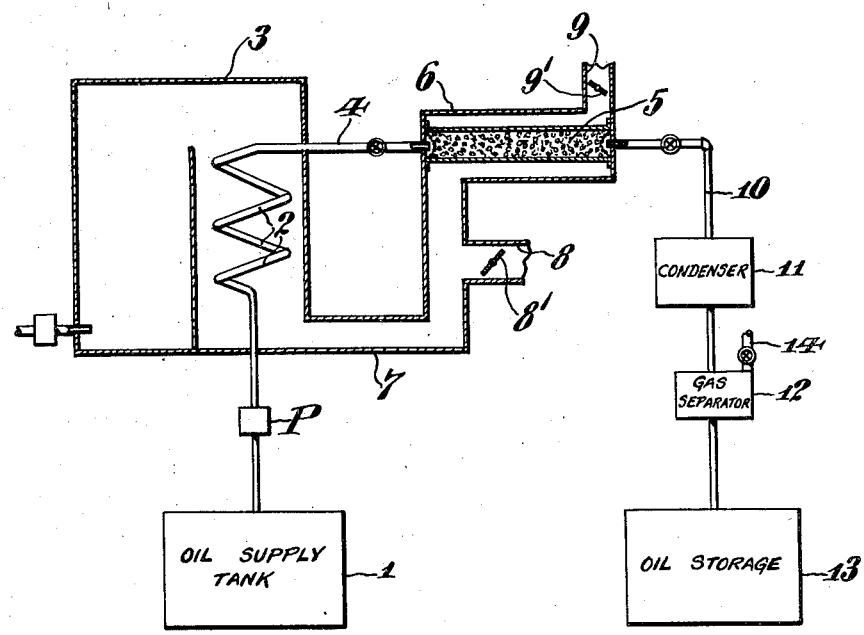
Inventor
William M. Malisoff
By T. Wallace Quinn
his Attorney Patented Sept. 24, 1935

2,015,080

UNITED STATES PATENT OFFICE 2,015,080

SULPHUR REMOVAL FROM HYDROCARBON OILS

William M. Malisoff, Philadelphia, Pa., assignor to The Atlantic Refining Company, Philadelphia, Pa., a corporation of Pennsylvania Application December 9, 1930, Serial No. 501,039

12 Claims. (Cl. 196—27)

The present invention relates to the art of refining hydrocarbon oil, and has particular reference to the removal of sulphur contained therein.

While my invention may be applied to effect removal of sulphur from substantially any hydrocarbon oil, it is particularly adapted to the treatment of light petroleum fractions, such as naphtha, gasoline, kerosene, and gas oil.

I have found that by contacting sulphur-containing oils with aluminum sulphide, maintained at suitable elevated temperatures, conversion of a substantial portion of the sulphur content of the oil into hydrogen sulphide, which may be readily removed from the oil, is effected. In my process, the aluminum sulphide seems to act as a catalyst, since during the treatment it apparently remains unchanged chemically. It is to be noted that since the aluminum sulphide remains substantially unchanged chemically during my process, it may be used for an extended period of time.

It is preferred to effect the contact between the aluminum sulphide and the sulphur-containing oil in the vapor phase, and my process will be more specifically described with respect to this preferred procedure.

In order to bring about the desired conversion of sulphur in the oil in accordance with my process, the oil is vaporized and heated to a temperature of approximately 300° C. or above, and simultaneously or subsequently is passed into contact with aluminum sulphide maintained at a temperature at or above substantially 300° C., and sufficiently high to prevent substantial condensation or vapors during treatment. Temperatures between substantially 300° C. and 700° C. may be employed. I may obtain a material conversion of sulphur while cracking a hydrocarbon oil in the presence of aluminum sulphide; however, in case cracking is not desirable, it is preferred to carry out my process at a temperature between 300° C. and 425° C., for example. After effecting the desired conversion of sulphur compounds into such form as will permit ready separation and removal of sulphur from the oil, the oil vapors are condensed, and the hydrogen sulphide into which the sulphur has been converted, being a gas, may be readily separated therefrom. Subsequently, the condensed oil may be subjected to further treatments, such as washing with aqueous alkali in order to remove dissolved hydrogen sulphide and/or other undesirable substances remaining therein.

The time of contact necessary to effect conversion of the sulphur compounds into hydrogen sulphide will depend upon such factors as the particular type of hydrocarbon oil being treated, the temperature at which the treatment is carried out, and extent to which removal of sulphur from the oil is desired. The time of contact in general, may be of the order of from one-half second to one minute. I have found in many instances that approximately twenty seconds is a particularly desirable time of contact.

In the operation of my process I have found it advantageous to remove the hydrogen sulphide as it is formed, and for this purpose I may employ any suitable method such as effecting contact between the sulphur-containing vapors and the aluminum sulphide in the presence of copper oxide, iron oxide, or other oxide or oxides capable of removing hydrogen sulphide by reacting therewith to form corresponding metallic sulphides and water, thereby removing the hydrogen sulphide from the zone of reaction almost simultaneously with its formation.

The presence of moisture in the vapors to be treated according to my process tends to cause hydrolyzation of the aluminum sulphide, and for this reason I prefer to dehydrate the vapors or the oil prior to vaporization, for example, by well known processes such as contacting the oil with quicklime.

A high degree of efficiency may be attained by carrying out my process in a semi-continuous or continuous manner.

The following description of a preferred modification of my process will illustrate its operation.

The single figure in the accompanying drawing is an elevational view, partly in section, of one type of apparatus in which my process may be carried out.

In the drawing, the hydrocarbon oil to be treated is transferred by pump P from any suitable source 1 into coils 2 of the pipe still 3. The oil is vaporized in the pipe still and the vapor heated to a temperature of 300° C. or above. If cracking is desired the temperature of the oil may be raised sufficiently high for this purpose without substantially affecting the sulphur removal to be effected subsequently. The heated oil vapors leave the pipe still through valve controlled line 4, and are directed into and through treating chamber 5. The treating chamber is maintained at a suitable elevated temperature by means of flue gases passing from the pipe still through conduit 7 into the heating space provided by jacket 6 surrounding the treating chamber, from which space the gases are conducted to a stack by flue 9. Flue 8 forms a parallel connection with flue 9 to the stack, and by regulation of valve 8' and 9' the temperature of the treating chamber may be maintained at suitable temperatures above 300° C. In certain cases, it may be desirable to merely insulate the treating chamber, whereby the temperature of the incoming vapors is sufficiently high to maintain the treating chamber at the proper temperature.

In passing through treating chamber 5, the heated oil vapors come into intimate contact with aluminum sulphide contained therein, whereby sulphur is liberated from the hydrocarbon with the formation of hydrogen sulphide. After passing through the treating chamber, the resultant mixture of hydrocarbon vapors and hydrogen sulphide is transferred through valve controlled line 10 into condenser 11 wherein the hydrocarbon vapors are condensed. The mixture of liquid hydrocarbons and gaseous hydrogen sulphide is then passed into gas separator 12, where the liquid hydrocarbons are separated from undissolved hydrogen sulphide, the former being transferred to storage tank 13, and the latter being passed to suitable storage or otherwise disposed of, through line 14.

My process may be more clearly understood from the following specific example:

500 parts of a naphtha obtained by cracking and containing 0.4% sulphur was passed in the vapor phase over one part of aluminum sulphide, the temperature of the naphtha and aluminum sulphide being substantially 425° C. The rate of flow of naphtha vapors was so regulated that approximately 20 seconds contact with the aluminum sulphide was allowed. After condensation and washing with aqueous alkali to remove dissolved hydrogen sulphide, the naphtha showed a sulphur content of 0.04%.

What I claim is:

1. In a process for removing sulphur from hydrocarbon oils, the step which comprises contacting the sulphur-containing oil with aluminum sulphide, said contact being effected at a temperature above 300° C. and in the absence of hydrogen introduced from an extraneous source.

2. In a process for removing sulphur from hydrocarbon oils, the steps which comprise vaporizing the sulphur-containing oil, and contacting the oil vapor with aluminum sulphide, said contact being effected at a temperature above substantially 300° C., and in the absence of hydrogen introduced from an extraneous source.

3. In a process for removing hydrocarbon-sulphur compounds from hydrocarbon oils, the steps which comprise vaporizing the sulphur-containing oil, and contacting the oil vapor with aluminum sulphide, said contact being effected at a temperature between 300° C. and the cracking temperature of the oil, and in the absence of hydrogen introduced from an extraneous source.

4. In a process for removing sulphur from hydrocarbon oils, the steps which comprise vaporizing the sulphur-containing oil, and contacting the oil vapor with aluminum sulphide, said contact being effected at the cracking temperature of the oil, and in the absence of hydrogen introduced from an extraneous source.

5. A process for removing sulphur from hydrocarbon oils, which comprises vaporizing the sulphur-containing oil, and contacting the oil with aluminum sulphide, said contact being effected at a temperature above substantially 300° C., in the absence of hydrogen introduced from an extraneous source, whereby hydrocarbon-sulphur compounds contained in the oil decompose to form hydrocarbons and hydrogen sulphide, condensing the oil vapor, and separating the hydrogen sulphide from the condensed oil.

6. In a process for removing sulphur from hydrocarbon oils, the step which comprises contacting substantially moisture-free vapors of said oil with aluminum sulphide in the absence of hydrogen introduced from an extraneous source, the temperature of said contact being between substantially 300° C. and 700° C.

7. A process for removing sulphur from hydrocarbon oils, which comprises vaporizing the sulphur-containing oil, and contacting the oil vapor with aluminum sulphide, said contact being effected at a temperature above substantially 300° C., and in the absence of hydrogen introduced from an extraneous source, whereby the sulphur compounds contained in the oil decompose to liberate hydrogen sulphide, and removing the hydrogen sulphide from the oil vapors continuously with its formation.

8. In a process for removing sulphur from hydrocarbon oils, the steps which comprise vaporizing the sulphur-containing oil, and contacting said oil vapor with aluminum sulphide and a metallic oxide, said contact being effected at a temperature above substantially 300° C., and in the absence of hydrogen introduced from an extraneous source.

9. In a process for removing sulphur from hydrocarbon oils, the steps which comprise vaporizing the sulphur containing oil and continuously passing said vaporized oil into and out of contact with aluminum sulphide, said contact being effected at a temperature above substantially 300° C., in the absence of hydrogen introduced from an extraneous source.

10. In a process for removing sulphur from hydrocarbon oils, the steps which comprise heating the sulphur-containing oil to a temperature above substantially 300° C., and continuously passing the oil so heated into and out of contact with aluminum sulphide, and in the absence of hydrogen introduced from an extraneous source.

11. In a process for removing sulphur from hydrocarbon oils, the predominant proportion of which vaporizes below substantially 300° C., the step which comprises contacting the sulphur-containing oil with aluminum sulphide at a temperature above substantially 300° C., in the absence of hydrogen introduced from an extraneous source.

12. In a process for removing sulphur from hydrocarbon oils, the predominant proportion of which vaporizes below substantially 300° C., the steps which comprise heating the sulphur-containing oil to a temperature above substantially 300° C., and in the absence of hydrogen introduced from an extraneous source, and continuously passing the oil so heated into and out of contact with aluminum sulphide.

WILLIAM M. MALISOFF.